(12) United States Patent
Shimizu et al.

(10) Patent No.: US 10,166,870 B2
(45) Date of Patent: Jan. 1, 2019

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Yu Shimizu, Nagakute (JP); Takashi Ando, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/889,572

(22) Filed: Feb. 6, 2018

(65) Prior Publication Data

US 2018/0222322 A1    Aug. 9, 2018

(30) Foreign Application Priority Data

Feb. 9, 2017  (JP) ................. 2017-022425

(51) Int. Cl.
*H02P 27/04* (2016.01)
*B60L 3/00* (2006.01)
(Continued)

(52) U.S. Cl.
CPC .............. *B60L 3/003* (2013.01); *B60K 6/445* (2013.01); *B60L 3/0046* (2013.01); *B60L 7/14* (2013.01); *B60L 7/18* (2013.01); *B60L 11/12* (2013.01); *B60L 11/1861* (2013.01); *B60L 15/007* (2013.01); *B60W 10/06* (2013.01); (Continued)

(58) Field of Classification Search
CPC ...... H02P 1/00; H02P 1/04; H02P 1/46; H02P 4/00; H02P 5/00; H02P 6/00; H02P 5/695; H02P 6/04; H02P 6/182; H02P 8/24; H02P 8/28; H02P 23/00; H02P 23/0027; H02P 23/0063; H02P 25/00; H02P 25/021; H02P 27/00; H02P 27/04; H02P 27/06; H02P 2005/4007; H02P 2201/09; H02P 2201/11; H02P 2201/07; H02P 6/18; B60L 3/003; B60L 3/0046; B60L 11/1861; B60L 15/007; B60K 6/445
USPC ......... 180/65.1, 65.21, 65.26, 65.265, 65.28, 180/65.29, 65.31, 65.51, 65.6, 379; 318/400.34, 11, 12, 34, 400.01, 700, 701, (Continued)

(56) References Cited

U.S. PATENT DOCUMENTS 8,140,205 B2 *  3/2012  Hanyu ................ B60K 6/48
                                                     701/22
8,350,442 B2 *  1/2013  Akutsu ................ B60K 6/448
                                                     310/112

FOREIGN PATENT DOCUMENTS

JP    2013-203116 A    10/2013
JP    2014-113003 A     6/2014
WO    2016087924 A1     6/2016

\* cited by examiner

*Primary Examiner* — Antony M Paul
(74) *Attorney, Agent, or Firm* — Sughrue Mion, PLLC (57) ABSTRACT

An electronic control unit is configured to control an engine such that in specified traveling where the vehicle travels while operating the engine with a first inverter and a second inverter kept in a shutdown state, a first motor is rotated at a speed that causes a counter-electromotive voltage of the first motor to be higher than direct current-side voltages of the first inverter and the second inverter, and the first motor outputs torque to a driving shaft through a planetary gear. The electronic control units are configured to interrupt electric power supply from the side of the first inverter and the second inverter to the side of an electric storage device (Continued)

when an accelerator operating amount becomes equal to or below a specified operating amount in the specified traveling.

5 Claims, 5 Drawing Sheets

(51) Int. Cl.
*B60L 11/18* (2006.01)
*B60L 15/00* (2006.01)
*B60W 10/06* (2006.01)
*B60W 10/26* (2006.01)
*B60W 10/08* (2006.01)
*B60K 6/445* (2007.10)
*B60L 7/14* (2006.01)
*B60L 7/18* (2006.01)
*B60L 11/12* (2006.01)
*B60W 30/18* (2012.01)
*B60W 20/14* (2016.01)
*B60W 20/15* (2016.01)
*B60L 3/04* (2006.01)

(52) U.S. Cl.
CPC ............ *B60W 10/08* (2013.01); *B60W 10/26* (2013.01); *B60W 20/14* (2016.01); *B60W 30/18127* (2013.01); *B60L 3/04* (2013.01); *B60L 2220/42* (2013.01); *B60W 20/15* (2016.01); *B60Y 2200/92* (2013.01); *B60Y 2400/61* (2013.01)

(58) Field of Classification Search
USPC .......... 318/727, 362, 371, 375, 376, 400.14, 318/400.15, 800, 801, 805, 812, 721
See application file for complete search history.

HYBRID VEHICLE AND CONTROL METHOD FOR HYBRID VEHICLE

INCORPORATION BY REFERENCE

The disclosure of Japanese Patent Application No. 2017-022425 filed on Feb. 9, 2017 including the specification, drawings and abstract is incorporated herein by reference in its entirety.

BACKGROUND

1. Technical Field

The present disclosure relates to a hybrid vehicle and a control method for the hybrid vehicle.

2. Description of Related Art

There is proposed a hybrid vehicle including an engine, a first motor, and a planetary gear mechanism including a carrier, a sun gear, and a ring gear connected to the engine, the first motor, and an output member coupled with driving wheels. The hybrid vehicle also includes a second motor connected to the output member, an inverter that drives the first motor and the second motor, and a battery connected to the inverter through an electric power line (see, for example, Japanese Patent Application Publication No. 2013-203116). When the hybrid vehicle travels while operating the engine with the inverter kept in a shutdown state, the hybrid vehicle controls the engine based on a direct current-side voltage of the inverter, a speed of the output member, and an accelerator operating amount so that a counter-electromotive voltage generated with rotation of the first motor becomes higher than the direct current-side voltage of the inverter. With such control, the hybrid vehicle regulates braking torque attributed to the counter-electromotive voltage of the first motor, and regulates counterforce torque (driving torque generated in the output member) of the braking torque.

SUMMARY

Assuming a case where the hybrid vehicle is traveling by the counterforce torque (driving torque) of the braking torque while operating the engine with the inverter in the shutdown state, when the accelerator operating amount becomes sufficiently small (for example, when the accelerator is turned off), the speed of the first motor (engine) decreases due to such causes as engine friction. When the counter-electromotive voltage of the first motor becomes equal to or below the direct current-side voltage of the inverter, the counterforce torque output to the output member stops. Accordingly, it may take a long time until the counterforce torque output to the output member stops, and therefore it may take a long time until a deceleration of the vehicle increases to a certain level.

A hybrid vehicle of the present disclosure shortens the time until a deceleration of the vehicle increases to a certain level when an accelerator operating amount becomes sufficiently small while the hybrid vehicle is traveling while operating an engine with an inverter kept in a shutdown state.

The hybrid vehicle of the present disclosure adopts the following means in order to accomplish the primary object.

A first aspect of the present disclosure relates to a hybrid vehicle. The hybrid vehicle includes an engine, a first motor, a planetary gear, a second motor, a first inverter, a second inverter, an electric storage device, and electronic control units. The first motor generates a counter-electromotive voltage with rotation. The planetary gear includes three rotation elements connected to three shafts. The shafts include a shaft of the first motor, a shaft of the engine, and a driving shaft coupled with driving wheels. The rotation elements are connected such that the first motor, the engine, and the driving shaft are arrayed in this order in an alignment chart. The second motor is connected to the driving shaft. The first inverter drives the first motor. The second inverter drives the second motor. The electric storage device is connected to the first inverter and the second inverter through electric power lines. The electronic control unit is configured to control the engine such that in specified traveling where the hybrid vehicle travels while operating the engine with the first inverter and the second inverter kept in a shutdown state, the first motor is rotated at a speed that causes the counter-electromotive voltage of the first motor to be higher than direct current-side voltages of the first inverter and the second inverter, and the first motor outputs torque to the driving shaft through the planetary gear. The electronic control unit is configured to interrupt electric power supply from the side of the first inverter and the second inverter to the side of the electric storage device when an accelerator operating amount becomes equal to or below a specified operating amount in the specified traveling.

With the configuration, in the specified traveling where the hybrid vehicle travels while operating the engine with the first inverter and the second inverter kept in the shutdown state, the electronic control unit controls the engine such that the first motor is rotated at the speed that causes the counter-electromotive voltage of the first motor to be higher than the direct current-side voltages of the first inverter and the second inverter, and the first motor outputs torque to the driving shaft through the planetary gear. When the counter-electromotive voltage of the first motor is set higher than the direct current-side voltages of the first inverter and the second inverter, regeneration torque attributed to the counter-electromotive voltage is generated in the first motor. Accordingly, the driving torque based on the regeneration torque is output to the driving shaft, so that the vehicle can travel. When the accelerator operating amount becomes equal to or below the specified operating amount in the specified traveling, the electronic control unit is controlled to interrupt electric power supply from the side of the first inverter side and the second inverter to the side of the electric storage device. As a consequence, generation of the regeneration torque in the first motor attributed to the counter-electromotive voltage stops, and the driving torque based on the regeneration torque is no longer output to the driving shaft. In this case, it is possible to shorten the time until the driving torque output stops as compared with the case where electric power supply from the side of the first inverter and the second inverter to the side of the electric storage device is not interrupted (the electronic control unit waits for the time when the driving torque output stops as the speed of the first motor decreases). As a result, it is possible to shorten the time until the deceleration of the vehicle increases to a certain level (for example, until the deceleration reaches the level corresponding to the level at a time when a gear is in a neutral position). Here, a term "specified operating amount" refers to a threshold used for determining whether or not a driver has an intention of deceleration (the accelerator operation amount is sufficiently small).

The hybrid vehicle may further include a step up-down converter provided in the electric power lines, the step up-down converter being configured to transfer electric power between the side of the electric storage device and the side of the first inverter and the second inverter while changing voltage of the electric power. The electronic control unit may be configured to control the engine and the step up-down converter such that the counter-electromotive voltage of the first motor becomes higher than the direct current-side voltages of the first inverter and the second inverter, when the accelerator operating amount is larger than the specified operating amount in the specified traveling. The electronic control unit may be configured to interrupt electric power supply from the side of the first inverter and the second inverter to the side of the electric storage device by shutting down the step up-down converter, when the accelerator operating amount becomes equal to or below the specified operating amount in the specified traveling. With the configuration, when the accelerator operating amount becomes equal to or below the specified operating amount in the specified traveling, generation of the regeneration torque in the first motor is prevented by shutting down the boost converter. This makes it possible to stop the driving torque output to the driving shaft.

The hybrid vehicle may further include a relay provided in the electric power lines. The electronic control unit may be configured to interrupt electric power supply from the side of the first inverter and the second inverter to the side of the electric storage device by turning off the relay, when the accelerator operating amount becomes equal to or below the specified operating amount in the specified traveling. With the configuration, when the accelerator operating amount becomes equal to or below the specified operating amount in the specified traveling, generation of the regeneration torque in the first motor is stopped by turning off the relay. This makes it possible to prevent the driving torque output to the driving shaft.

In the hybrid vehicle, the electronic control unit may be configured to control the engine such that, when the accelerator operating amount becomes equal to or below the specified operating amount in the specified traveling, the speed of the engine becomes smaller than the speed of the engine at a time when the accelerator operating amount is larger than the specified operating amount. With the configuration, when the accelerator operating amount becomes equal to or below the specified operating amount in the specified traveling, the speed of the engine is set to be relatively small. This makes it possible to suppress fuel consumption in the engine.

A second aspect of the present disclosure relates to a control method for a hybrid vehicle. The hybrid vehicle includes an engine, a first motor, a planetary gear, a second motor, a first inverter, a second inverter, an electric storage device, and electronic control unit. The first motor generates a counter-electromotive voltage with rotation. The planetary gear includes three rotation elements connected to three shafts, the shafts including a shaft of the first motor, a shaft of the engine, and a driving shaft coupled with driving wheels, the rotation elements being connected such that the first motor, the engine, and the driving shaft are arrayed in this order in an alignment chart. The second motor is connected to the driving shaft. The first inverter drives the first motor. The second inverter drives the second motor. The electric storage device is connected to the first inverter and the second inverter through electric power lines. The electronic control unit is configured to control the engine such that in specified traveling where the hybrid vehicle travels while operating the engine with the first inverter and the second inverter kept in a shutdown state, the first motor is rotated at a speed that causes the counter-electromotive voltage of the first motor to be higher than direct current-side voltages of the first inverter and the second inverter, and the first motor outputs torque to the driving shaft through the planetary gear. The control method includes interrupting, by the electronic control unit, electric power supply from the side of the first inverter and the second inverter to the side of the electric storage device when an accelerator operating amount becomes equal to or below a specified operating amount in the specified traveling.

With the configuration, in the specified traveling where the hybrid vehicle travels while operating the engine with the first inverter and the second inverter kept in the shutdown state, the electronic control unit control the engine such that the first motor is rotated at the speed that causes the counter-electromotive voltage of the first motor to be higher than the direct current-side voltages of the first inverter and the second inverter, and the first motor outputs torque to the driving shaft through the planetary gear. When the counter-electromotive voltage of the first motor is set higher than the direct current-side voltages of the first inverter and the second inverter, regeneration torque attributed to the counter-electromotive voltage is generated in the first motor. Accordingly, driving torque based on the regeneration torque is output to the driving shaft, so that the vehicle can travel. When the accelerator operating amount becomes equal to or below the specified operating amount in the specified traveling, the electronic control unit is controlled to interrupt electric power supply from the side of the first inverter and the second inverter to the side of the electric storage device. As a consequence, generation of the regeneration torque attributed to the counter-electromotive voltage in the first motor stops, so that the driving torque based on the regeneration torque is no longer output to the driving shaft. In this case, the time until the driving torque output stops can be shortened as compared with the case where electric power supply from the side of the first inverter and the second inverter to the side of the electric storage device is not interrupted (the electronic control unit waits for the time when the driving torque output stops as the speed of the first motor decreases). As a result, it becomes possible to shorten the time until the deceleration of the vehicle increases to a certain level (for example, until the deceleration reaches the level corresponding to the level at a time when the gear is in the neutral position).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Now, modes for carrying out the present disclosure will be described in detail based on embodiments.

Figure 1:
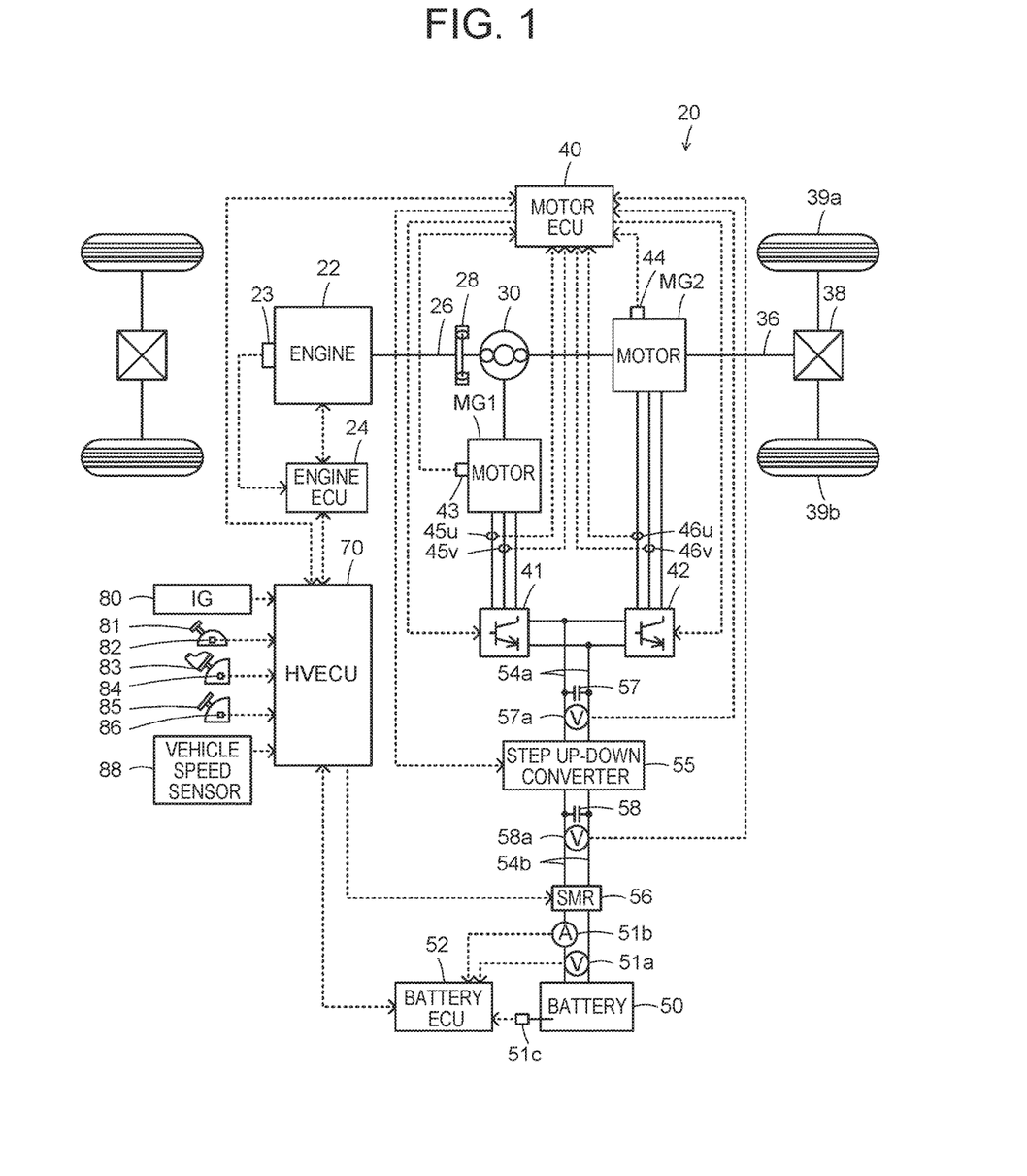
FIG. 1 is a block diagram illustrating an outlined configuration of a hybrid vehicle 20 as one embodiment of the present disclosure.
Figure 2:
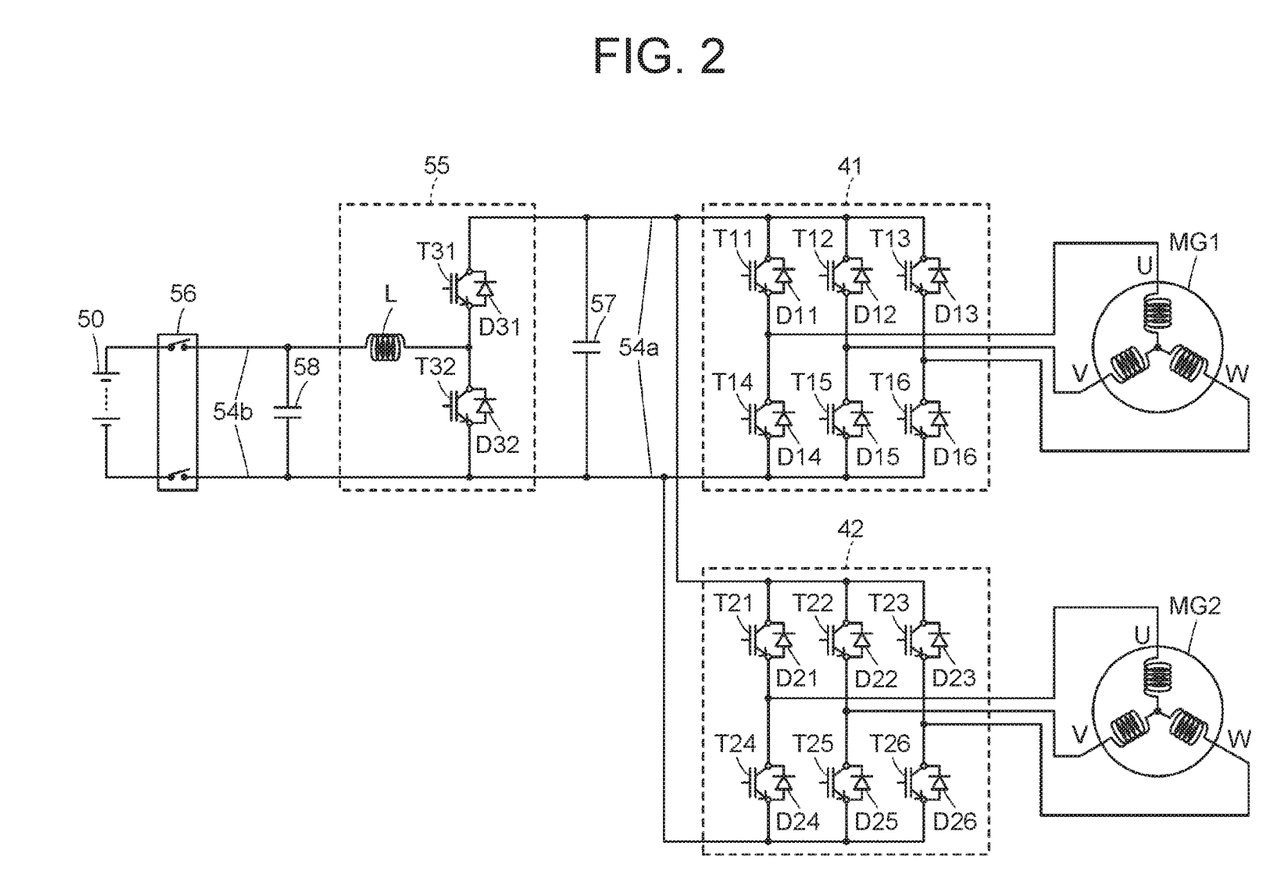
FIG. 2 is a block diagram illustrating an outlined configuration of an electric drive system including motors MG1, MG2.

FIG. 1 is a block diagram illustrating an outlined configuration of a hybrid vehicle 20 as one embodiment of the present disclosure. FIG. 2 is a block diagram illustrating an outlined configuration of an electric drive system including motors MG1, MG2. The hybrid vehicle 20 of the embodiment includes, as illustrated in the drawing, an engine 22, a planetary gear 30, motors MG1, MG2, inverters 41, 42, a step up-down converter 55, a battery 50 as an electric storage device, a system main relay 56, and a hybrid electronic control unit (referred to as "HVECU" below) 70.

The engine 22 is configured as an internal combustion engine that outputs motive power by using fuel such as gasoline, and gas oil. The operation of the engine 22 is controlled by an engine electronic control unit (referred to as "engine ECU" below) 24.

Although not illustrated, the engine ECU 24 is configured as a microprocessor having a CPU as a main component. The engine ECU 24 includes, in addition to the CPU, a ROM that stores processing programs, a RAM that temporarily stores data, input and output ports, and a communication port. The engine ECU 24 receives, through the input port, input of signals from various sensors necessary for operation control of the engine 22, the signals including, for example, a crank angle θcr from a crank position sensor 23 that detects a rotational position of a crankshaft 26 of the engine 22. The engine ECU 24 outputs various control signals for operation control of the engine 22 through the output port. The engine ECU 24 is connected with the HVECU 70 through the communication port. The engine ECU 24 calculates a speed Ne of the engine 22 based on the crank angle θcr from the crank position sensor 23.

The planetary gear 30 is configured as a single pinion-type planetary gear mechanism. The planetary gear 30 has a sun gear connected to a rotor of the motor MG1. The planetary gear 30 has a ring gear connected to a driving shaft 36 coupled with driving wheels 39a, 39b through a differential gear 38. The planetary gear 30 has a carrier connected to the crankshaft 26 of the engine 22 through a damper 28.

The motor MG1 is configured as a synchronous generator-motor including a rotor with a permanent magnet embedded therein and a stator with a three-phase coil wound therearound. As described before, the rotor is connected to the sun gear of the planetary gear 30. The motor MG2 is configured as a synchronous generator-motor as in the case of the motor MG1. The motor MG2 has a rotor connected to the driving shaft 36.

The inverters 41, 42 are used for driving the motors MG1, MG2. As illustrated in FIG. 2, the inverter 41 is connected to a high voltage-side electric power line 54a. The inverter 41 has six transistors T11 to T16, and six diodes D11 to D16 that are connected in parallel with the six transistors T11 to T16, respectively. The transistors T11 to T16 are disposed in pairs composed of two transistors to act as a source side and a sink side, respectively, for a positive electrode-side line and a negative electrode-side line of the high voltage-side electric power line 54a. Junction points between the transistors that make pairs of the transistors T11 to T16 are connected to coils of the three-phase coil (U phase, V phase, W phase) of the motor MG1, respectively. Therefore, when voltage acts on the inverter 41, an electronic control unit for motors (hereinafter referred to as "motor ECU") 40 regulates a ratio of turn-on times of the transistors that make the pairs of the transistors T11 to T16. As a result, a rotating field is formed in the three-phase coil, so that the motor MG1 is rotationally driven. Like the inverter 41, the inverter 42 is connected to the high voltage-side electric power line 54a. The inverter 42 also has six transistors T21 to T26 and six diodes D21 to D26. When voltage acts on the inverter 42, the motor ECU 40 regulates a ratio of turn-on times of the transistors that make the pairs of the transistors T21 to T26. As a result, a rotating field is formed in the three-phase coil, so that the motor MG2 is rotationally driven.

The step up-down converter 55 is connected to the high voltage-side electric power line 54a and a low voltage-side electric power line 54b. The step up-down converter 55 has two transistors T31, T32, two diodes D31, D32 that are connected in parallel to the transistors T31, T32, respectively, and a reactor L. The transistor T31 is connected to the positive electrode-side line of the high voltage-side electric power line 54a. The transistor T32 is connected to the transistor T31, the negative electrode-side line of the high voltage-side electric power line 54a, and a negative electrode-side line of the low voltage-side electric power line 54b. The reactor L is connected to a junction point between the transistor T31 and the transistor T32 and to a positive electrode-side line of the low voltage-side electric power line 54b. As a ratio of turn-on times of the transistors T31, T32 is regulated by the motor ECU 40, the step up-down converter 55 steps up the voltage of electric power of the low voltage-side electric power line 54b and supplies the electric power to the high voltage-side electric power line 54a, or steps down the voltage of electric power of the high voltage-side electric power line 54a and supplies the electric power to the low voltage-side electric power line 54b. The positive electrode-side line and the negative electrode-side line of the high voltage-side electric power line 54a are equipped with a smoothing capacitor 57. The positive electrode-side line and the negative electrode-side line of the low voltage-side electric power line 54b are equipped with a smoothing capacitor 58.

Although not illustrated, the motor ECU 40 is configured as a microprocessor having a CPU as a main component. The motor ECU 40 includes, in addition to the CPU, a ROM that stores processing programs, a RAM that temporarily stores data, input and output ports, and a communication port. As illustrated in FIG. 1, the motor ECU 40 receives input of signals from various sensors necessary for drive control of the motors MG1, MG2 and the step up-down converter 55 through the input port. Examples of the signals input into the motor ECU 40 may include rotational positions θm1, θm2 from rotational position detection sensors 43, 44 that detect rotational positions of the rotors of the motors MG1, MG2, and phase currents Iu1, Iv1, Iu2, Iv2 from current sensors 45u, 45v, 46u, 46v that detect electric currents flowing in respective phases of the motors MG1, MG. The examples of the signals may also include a voltage (high voltage-side voltage) VH of the capacitor 57 (high voltage-side electric power line 54a) from a voltage sensor 57a attached between the terminals of the capacitor 57, and a voltage (low voltage-side voltage) VL of the capacitor 58 (low voltage-side electric power line 54b) from a voltage sensor 58a attached between the terminals of the capacitor 58. The motor ECU 40 outputs various control signals for performing drive control of the motors MG1, MG2 and the step up-down converter 55 through the output port.

Examples of the signals output from the motor ECU 40 may include switching control signals to the transistors T11 to T16, T21 to T26 of the inverters 41, 42, and switching control signals to the transistors T31, T32 of the step up-down converter 55. The motor ECU 40 is connected with the HVECU 70 through the communication port. The motor ECU 40 calculates electrical angles $\theta e1$, $\theta e2$, angular speeds $\omega m1$, $\omega m2$, and speeds Nm1, Nm2 of the motors MG1, MG2 based on the rotational positions $\theta m1$, $\theta m2$ of the rotors of the motors MG1, MG2 from the rotational position detection sensors 43, 44.

For example, the battery 50 is configured as a lithium-ion secondary battery or a nickel-hydrogen secondary battery having such a rated voltage as 250 V, 280 V, and 300 V. The battery 50 is connected to the low voltage-side electric power line 54b. The battery 50 is managed by a battery electronic control unit (hereinafter referred to as "battery ECU") 52.

Although not illustrated, the battery ECU 52 is configured as a microprocessor having a CPU as a main component. The battery ECU 52 includes, in addition to the CPU, a ROM that stores processing programs, a RAM that temporarily stores data, input and output ports, and a communication port. The battery ECU 52 receives input of signals from various sensors necessary for management of the battery 50 through the input port. Examples of the signals input into the battery ECU 52 may include a voltage Vb of the battery 50 from a voltage sensor 51a attached between the terminals of the battery 50, and a current Ib of the battery 50 from a current sensor 51b attached to an output terminal of the battery 50, and a temperature Tb of the battery 50 from a temperature sensor 51c attached to the battery 50. The battery ECU 52 is connected with the HVECU 70 through the communication port. The battery ECU 52 calculates a state of charge SOC based on an integrated value of the electric current Ib of the battery 50 from the current sensor 51b. The state of charge SOC refers to a ratio of capacity of electric power dischargeable from the battery 50 to the total capacity of the battery 50.

The system main relay 56 is provided in a portion of the low voltage-side electric power line 54b closer to the battery 50 than the capacitor 58. The system main relay 56 connects and disconnects between the battery 50 and the step up-down converter 55 when on-off control of the system main relay 56 is performed by the HVECU 70.

Although not illustrated, the HVECU 70 is configured as a microprocessor having a CPU as a main component. The HVECU 70 includes, in addition to the CPU, a ROM that stores processing programs, a RAM that temporarily stores data, input and output ports, and a communication port. The HVECU 70 receives signals from various sensors through the input port. Examples of the signals input into the HVECU 70 may include an ignition signal from an ignition switch 80, and a shift position SP from a shift position sensor 82 that detects an operative position of a shift lever 81. The examples of the signals may also include an accelerator operation amount Acc from an accelerator pedal position sensor 84 that detects a stepping-in amount of an accelerator pedal 83, a brake pedal position BP from a brake pedal position sensor 86 that detects the stepping-in amount of the brake pedal 85, and a vehicle speed V from a vehicle speed sensor 88. The shift position SP includes a parking position (P position), a reversing position (R position), a neutral position (N position), and a driving position (D position). As described before, the HVECU 70 is connected with the engine ECU 24, the motor ECU 40, and the battery ECU 52 through the communication port.

The hybrid vehicle 20 in the thus-configured embodiment travels in travel modes such as a hybrid travel (HV travel) mode for traveling while operating the engine 22, or an electric travel (EV travel) mode for traveling without operating the engine 22.

In the HV travel mode, the HVECU 70 sets a request torque Td* requested to the driving shaft 36 based on the accelerator operation amount Acc and the vehicle speed V, and multiplies the set request torque Td* by a speed Nd of the driving shaft 36 (speed Nm2 of the motor MG2) to calculate a request power Pd* requested to the driving shaft 36. Next, the HVECU 70 sets a request power Pe* requested to the engine 22, the request power Pe* being obtained by subtracting a charge-discharge request power Pb* (which takes a positive value at the time of discharging from the battery 50) based on the state of charge SOC of the battery 50 from the request power Pd*. Next, the HVECU 70 sets a target speed Ne* and a target torque Te* of the engine 22, and torque commands Tm1*, Tm2* of the motors MG1, MG2, so that the request power Pe* is output from the engine 22, and the request torque Td* is output to the driving shaft 36. Next, the HVECU 70 sets a target voltage VH* of the high voltage-side electric power line 54a based on the torque commands Tm1*, Tm2* and the speeds Nm1, Nm2 of the motors MG1, MG2. The HVECU 70 then transmits the target speed Ne* and the target torque Te* of the engine 22 to the engine ECU 24, and transmits the torque commands Tm1*, Tm2* of the motors MG1, MG2 and the target voltage VH* of the high voltage-side electric power line 54a to the motor ECU 40. The engine ECU 24 performs control of the engine 22, such as air-intake control, fuel injection control, and ignition control, so that the engine 22 is operated based on the target speed Ne* and the target torque Te*. The motor ECU 40 performs switching control of the transistors T11 to T16, T21 to T26 of the inverters 41, 42 so that the motors MG1, MG2 are driven based on the torque commands Tm1*, Tm2*. At the same time, the motor ECU 40 performs switching control of the transistors T31, T32 of the step up-down converter 55 so that the voltage VH of the high voltage-side electric power line 54a becomes the target voltage VH*.

In the EV travel mode, the HVECU 70 sets the request torque Td* based on the accelerator operation amount Acc and the vehicle speed V, while setting the torque command Tm1* of the motor MG1 to a value zero, and setting the torque command Tm2* of the motor MG2 so that the request torque Td* is output to the driving shaft 36. The HVECU 70 also sets the target voltage VH* of the high voltage-side electric power line 54a based on the torque commands Tm1*, Tm2* and the speeds Nm1, Nm2 of the motors MG1, MG2. The HVECU 70 then transmits the torque commands Tm1*, Tm2* of the motors MG1, MG2 and the target voltage VH* of the high voltage-side electric power line 54a to the motor ECU 40. The control of the inverters 41, 42 and the step up-down converter 55 by the motor ECU 40 is described before.

Figure 3:
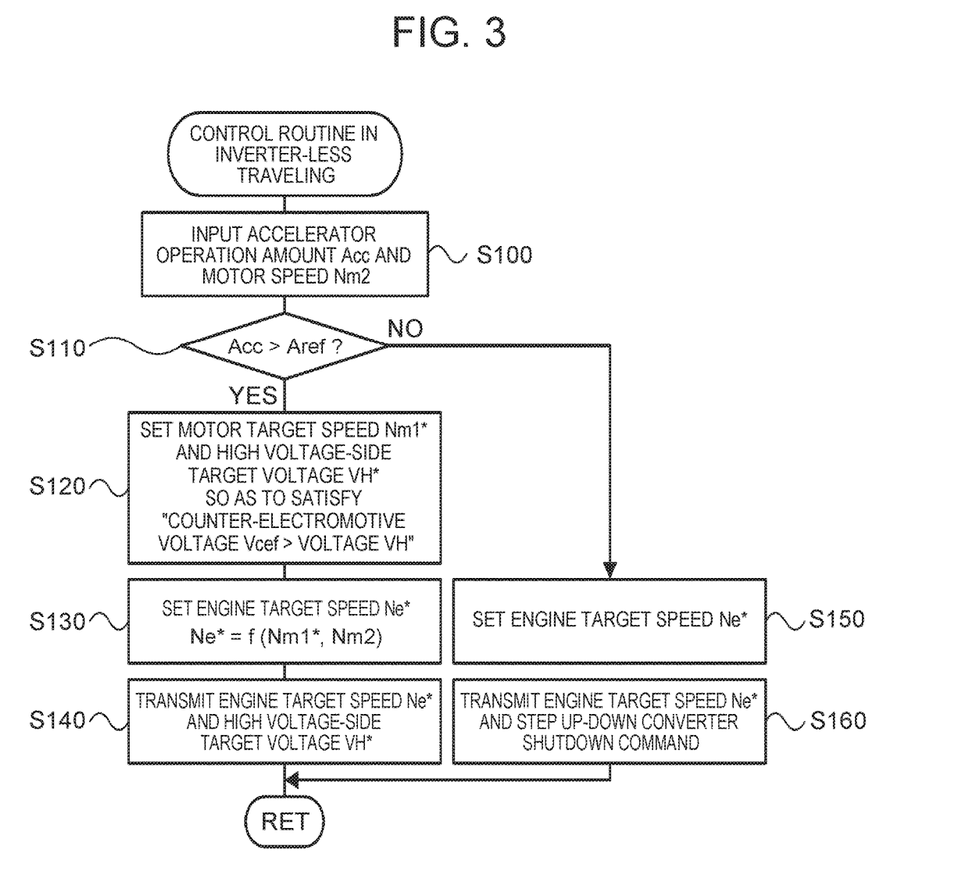
FIG. 3 is a flowchart of a control routine in inverter-less traveling executed by an HVECU 70 of the embodiment.

A description is now given of the operation of the hybrid vehicle 20 of the thus-configured embodiment, and more particularly the operation in inverter-less traveling (limp home) where the hybrid vehicle travels while operating the engine 22 with the inverters 41, 42 kept in the shutdown state (the transistors T11 to T16, T21 to T26 all in an off state). Here, the inverter-less traveling is performed when abnormality occurs in the inverters 41, 42 or the sensors (such as the rotational position detection sensors 43, 44) used for control of the inverters 41, 42 during traveling in the HV travel mode. FIG. 3 is a flowchart illustrating one example of a control routine in the inverter-less traveling executed by the HVECU 70 in the embodiment. The routine is repeatedly executed in the inverter-less traveling.

When the control routine in the inverter-less traveling is executed, the HVECU 70 inputs the accelerator operation amount Acc and the speed Nm2 of the motor MG2 (step S100). Here, the accelerator operation amount Acc is input as a value detected by the accelerator pedal position sensor 84. As the speed Nm2 of the motor MG2, a value calculated based on the rotational position θm2 of the rotor of the motor MG2 detected by the rotational position detection sensor 44 is input from the motor ECU 40 through communication.

Once the data is input in this way, the input accelerator operation amount Acc is compared with a threshold Aref (step S110). Here, the threshold Aref is a threshold used for determining whether or not the driver has an intention of deceleration (the accelerator operation amount Acc is sufficiently small). As the threshold Aref, values such as 3%, 5%, and 7% may be used.

When the accelerator operation amount Acc is larger than the threshold Aref in step S110, the HVECU 70 determines that the driver has no intention of deceleration. Accordingly, the HVECU 70 sets a target speed Nm1* of the motor MG1 and a target voltage VH* of the high voltage-side electric power line 54a such that the counter-electromotive voltage Vcef generated with rotation of the motor MG1 becomes higher than the voltage VH of the high voltage-side electric power line 54a (step S120). Here, the counter-electromotive voltage Vcef of the motor MG1 corresponds to a product of the angular speed ωm1 and a counter-electromotive voltage constant Ke of the motor MG1.

Figure 4:
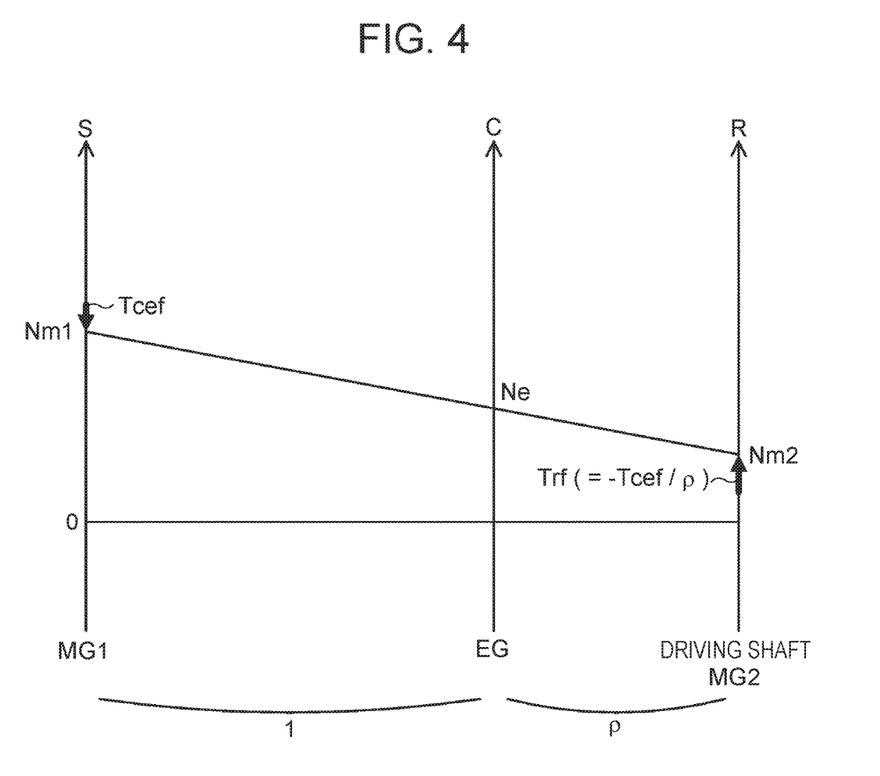
FIG. 4 is an explanatory view illustrating one example of an alignment chart of a planetary gear 30 at a time when a counter-electromotive voltage Vcef of the motor MG1 is higher than a voltage VH of a high voltage-side electric power line 54a in inverter-less traveling.

FIG. 4 is an explanatory view illustrating one example of an alignment chart of the planetary gear 30 at a time when the counter-electromotive voltage Vcef of the motor MG1 is higher than the voltage VH of the high voltage-side electric power line 54a in the inverter-less traveling. In FIG. 4, a left S-axis represents the speed of the sun gear of the planetary gear 30 that is the speed Nm1 of the motor MG1, a C-axis represents the speed of the carrier of the planetary gear 30 that is the speed Ne of the engine 22, and an R-axis represents the speed of the ring gear of the planetary gear 30 that is the speed Nm2 of the motor MG2 (and the speed Nd of the driving shaft 36). In FIG. 4, a value "p" represents a gear ratio (the number of teeth of the sun gear/the number of teeth of the ring gear) of the planetary gear 30. When the counter-electromotive voltage Vcef of the motor MG1 is higher than the voltage VH of the high voltage-side electric power line 54a, a regeneration torque Tcef based on a voltage difference (Vcef−VH) between the counter-electromotive voltage Vcef of the motor MG1 and the voltage VH of the high voltage-side electric power line 54a is generated in the motor MG1 as illustrated. As a result, a driving torque (counterforce torque) Trf (=−Tcef/ρ) based on the regeneration torque Tcef is output to the driving shaft 36. More specifically, the regeneration torque Tcef is generated when the motor MG1 is rotated while the engine 22 is operated, and the electric power based on the counter-electromotive voltage Vcef of the motor MG1 is rectified by the diode D11 to D16 of the inverter 41 and is supplied to the battery 50 through the high voltage-side electric power line 54a, the step up-down converter 55, and the low voltage-side electric power line 54b.

The processing of step S120 is for setting the target speed Nm1* of the motor MG1 and the target voltage VH* of the high voltage-side electric power line 54a such that the driving torque Trf is output to the driving shaft 36. In the embodiment, the target speed Nm1* of the motor MG1 is set to, for example, a speed (fixed value) around 4000 rpm to 6000 rpm. The target voltage VH* of the high voltage-side electric power line 54a is set to, for example, a voltage (fixed value) a few dozen V to a few hundred V higher than a rated voltage of the battery 50. The target speed Nm1* of the motor MG1 and the target voltage VH* of the high voltage-side electric power line 54a may be so set that an absolute value of the regeneration torque Tcef of the motor MG1 and by extension an absolute value of the driving torque Trf output to the driving shaft 36 increase more as the accelerator operation amount Acc is larger. For example, it may be considered to set the target speed Nm1* of the motor MG1 to a speed that tends to increase as the accelerator operation amount Acc is larger, or to set the target voltage VH* of the high voltage-side electric power line 54a to a voltage that tends to decrease as the accelerator operation amount Acc is larger.

Next, the target speed Ne* of the engine 22 is calculated by Expression (1) with the target speed Nm1* of the motor MG1, the speed Nm2 (speed Nd of the driving shaft 36) of the motor MG2, and the gear ratio ρ of the planetary gear 30 (step S130). Here, Expression (1) can easily be derived with reference to FIG. 4. The target speed Ne* of the engine 22 is transmitted to the engine ECU 24, and the target voltage VH* of the high voltage-side electric power line 54a is transmitted to the motor ECU 40 (step S140). Then, the present routine is ended. When receiving the target speed Ne* of the engine 22, the engine ECU 24 performs air-intake control, fuel injection control, and ignition control of the engine 22 such that the speed Ne of the engine 22 becomes the target speed Ne*. When receiving the target voltage VH* of the high voltage-side electric power line 54a, the motor ECU 40 performs switching control of the transistors T31, T32 of the step up-down converter 55 such that the voltage VH of the high voltage-side electric power line 54a becomes the target voltage VH*. In this case, the driving torque Trf is output to the driving shaft 36, so that the vehicle can travel.

$$Ne^* = (Nm1^* \cdot \rho + Nm2)/(1+\rho) \tag{1}$$

When the accelerator operation amount Acc is equal to or below the threshold Aref in step S110, the HVECU 70 determines that the driver has an intention of deceleration. Accordingly, the HVECU 70 sets the target speed Ne* of the engine 22 to be smaller as compared with the case where the accelerator operation amount Acc is larger than the threshold Aref (step S150). In the embodiment, the target speed Ne* of the engine 22 may be set to, for example, a speed (fixed value) around 1000 rpm to 1500 rpm. It is also possible to set the target speed Ne* of the engine 22 to a speed that tends to decrease as the voltage VH of the high voltage-side electric power line 54a is lower.

Once the target speed Ne* of the engine 22 is set, the HVECU 70 transmits the target speed Ne* of the engine 22 to the engine ECU 24, and transmits a shutdown command of the step up-down converter 55 to the motor ECU 40 (step S160). Then the present routine is ended. When receiving the target speed Ne* of the engine 22, the engine ECU 24 performs air-intake control, fuel injection control, and ignition control of the engine 22 such that the speed Ne of the engine 22 becomes the target speed Ne*. When receiving the shutdown command of the step up-down converter 55, the motor ECU 40 shuts down the step up-down converter 55 (turns off the transistors T31, T32).

When the step up-down converter 55 is shut down, electric power supply from the side of the high voltage-side electric power line 54a (the side of the inverter 41) to the side of the low voltage-side electric power line 54b (the side of the battery 50) is stopped. Accordingly, in the case where the counter-electromotive voltage Vcef of the motor MG1 is higher than the voltage VH of the high voltage-side electric power line 54a before the shutdown of the step up-down converter 55, that is, in the case where the regeneration torque Tcef is generated in the motor MG1 and the driving torque Trf is output to the driving shaft 36, the voltage VH of the high voltage-side electric power line 54a increases up to the level of the counter-electromotive voltage Vcef of the motor MG1 when the step up-down converter 55 is shut down. As a result, the regeneration torque Tcef is no longer generated, and the driving torque Trf output to the driving shaft 36 stops. In the case of the present embodiment, the time (time required in the embodiment) until the voltage VH of the high voltage-side electric power line 54a becomes equal to the counter-electromotive voltage Vcef of the motor MG1 after the shutdown of the step up-down converter 55 is shorter than the time (time required in the comparative example) until the speed Ne (speed Nm1 of the motor MG1) of the engine 22 decreases due to such causes as friction of the engine 22 and thereby the counter-electromotive voltage Vcef of the motor MG1 becomes equal to the voltage VH of the high voltage-side electric power line 54a in the case of the comparative example where the step up-down converter 55 is not shut down even when the accelerator operation amount Acc becomes equal to or below the threshold Aref. Therefore, in the case of the embodiment, as compared with the case of the comparative example, the time until the driving torque Trf output to the driving shaft 36 stops can be shortened. As a result, it becomes possible to shorten the time until the deceleration of the vehicle increases to a certain level (for example, until the deceleration reaches the level corresponding to the level at a time when the gear is in the neutral position). Moreover, in the embodiment, the target speed Ne* of the engine 22 at a time when the accelerator operation amount Acc becomes equal to or below the threshold Aref is made smaller than the target speed Ne* at a time when the accelerator operation amount Acc is larger than the threshold Aref. This makes it possible to suppress fuel consumption in the engine 22.

When the counter-electromotive voltage Vcef of the motor MG1 is less than the voltage VH of the high voltage-side electric power line 54a and the voltage VL of the low voltage-side electric power line 54b before shutdown of the step up-down converter 55, that is, when the regeneration torque Tcef is no longer generated in the motor MG1 and the driving torque Trf output to the driving shaft 36 stops, a size relation of the counter-electromotive voltage Vcef of the motor MG1 to the voltage VH of the high voltage-side electric power line 54a and the voltage VL of the low voltage-side electric power line 54b is unchanged even when the step up-down converter 55 is shut down. Accordingly, output of the driving torque Trf is kept stopped.

Figure 5:
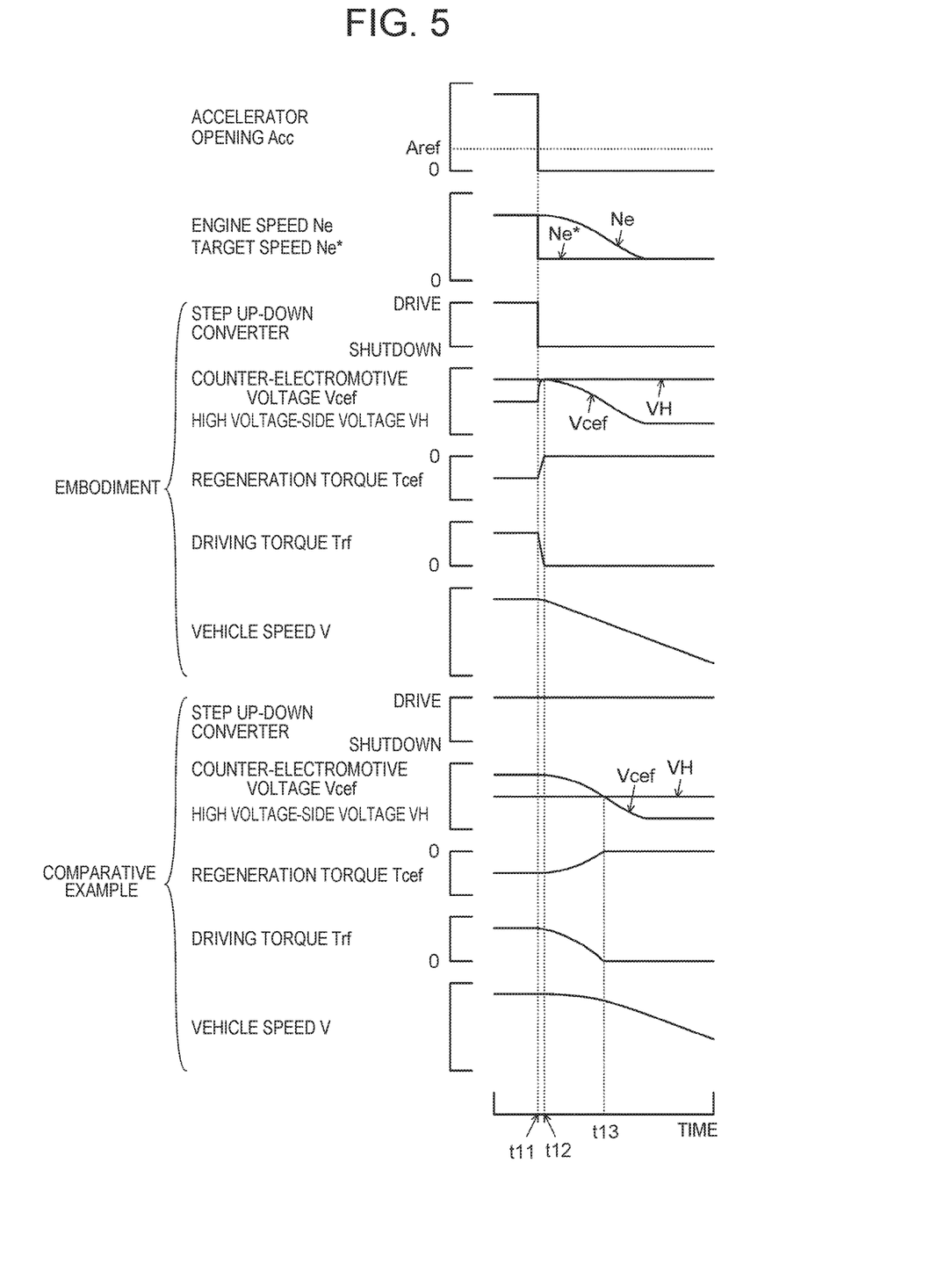
FIG. 5 is an explanatory view illustrating one example of the embodiment and the comparative example at a time when an accelerator operation amount Acc becomes equal to or below a threshold Aref in the inverter-less traveling.

FIG. 5 is an explanatory view illustrating one example of the embodiment and the comparative example at a time when the accelerator operation amount Acc becomes equal to or below the threshold Aref in inverter-less traveling. FIG. 5 illustrates the accelerator operation amount Acc, the speed Ne and target speed Ne* of the engine 22, the state of the step up-down converter 55, the counter-electromotive voltage Vcef of the motor MG1, the voltage VH of the high voltage-side electric power line 54a, the regeneration torque Tcef of the motor MG1, the driving torque Trf, and the situation of the vehicle speed V. In the comparative example, the step up-down converter 55 is not shut down (driving is continued) even when the accelerator operation amount Acc becomes equal to or below the threshold Aref (time t11). Consequently, when the speed Ne (speed Nm1 of the motor MG1) of the engine 22 decreases due to causes such as friction of the engine 22, and thereby the counter-electromotive voltage Vcef of the motor MG1 becomes equal to or below the voltage VH of the high voltage-side electric power line 54a, (time t13), the regeneration torque Tcef is no longer generated in the motor MG1, and the driving torque Trf output to the driving shaft 36 stops. As a result, the time until the deceleration of the vehicle increases to a certain level (for example, until the deceleration reaches the level corresponding to the level at a time when the gear is in the neutral position) may slightly be prolonged. Contrary to this, in the embodiment, when the accelerator operation amount Acc becomes equal to or below the threshold Aref (time t11), the step up-down converter 55 is shut down. Accordingly, the voltage VH of the high voltage-side electric power line 54a increases up to the level of the counter-electromotive voltage Vcef of the motor MG1 in an extremely short time (time t11 to time t12). As a result, the regeneration torque Tcef is no longer generated in the motor MG1, and the driving torque Trf output to the driving shaft 36 stops. Therefore, as compared with the comparative example, it becomes possible to shorten the time until the deceleration of the vehicle increases to a certain level (for example, until the deceleration reaches the level corresponding to the level at a time when the gear is in the neutral position).

In the hybrid vehicle 20 of the embodiment described in the foregoing, the engine 22 and the step up-down converter 55 are controlled in the inverter-less traveling such that the motor MG1 rotates at a speed that causes the counter-electromotive voltage Vcef of the motor MG1 to be higher than the voltage VH of the high voltage-side electric power line 54a, so that the regeneration torque Tcef is generated in the motor MG1 and the driving torque Trf is output to the driving shaft 36. Once the accelerator operation amount Acc becomes equal to or below the threshold Aref in the inverter-less traveling, the step up-down converter 55 is shut down. This makes it possible to shorten the time until the driving torque Trf output to the driving shaft 36 stops as compared with the case where the step up-down converter 55 is not shut down even when the accelerator operation amount Acc becomes equal to or below the threshold Aref. As a result, it becomes possible to shorten the time until the deceleration of the vehicle increases to a certain level (for example, until the deceleration reaches the level corresponding to the level at a time when the gear is in the neutral position).

In the hybrid vehicle 20 of the embodiment, when the accelerator operation amount Acc becomes equal to or below the threshold Aref in the inverter-less traveling, the step up-down converter 55 is shut down so as to interrupt electric power supply from the side of the inverters 41, 42 to the side of the battery 50. However, when the accelerator operation amount Acc becomes equal to or below the threshold Aref in the inverter-less traveling, the system main relay 56 may be turned off so as to interrupt electric power supply from the side of the inverters 41, 42 to the side of the battery 50. In this case, the same effect as the effect of the embodiment may also be demonstrated.

In the hybrid vehicle 20 of the embodiment, when the accelerator operation amount Acc becomes equal to or below the threshold Aref in the inverter-less traveling, in addition to the shutdown of the step up-down converter 55, the target speed Ne* of the engine 22 at a time when the accelerator operation amount Acc becomes equal to or below the threshold Aref is made smaller than the target speed Ne* at a time when the accelerator operation amount Acc is larger than the threshold Aref. However, the target speed Ne* of the engine 22 at a time when the accelerator operation amount Acc becomes equal to or below the threshold Aref may be made equal to or above the target speed Ne* at a time when the accelerator operation amount Acc is larger than the threshold Aref.

The hybrid vehicle 20 of the embodiment performs inverter-less traveling when abnormality occurs in the inverters 41, 42 or in the sensors used for control of the inverters 41, 42 during traveling in the HV travel mode. However, when the accelerator operation amount Acc from the accelerator pedal position sensor 84 is input not only into the HVECU 70 but also into the motor ECU 40, the hybrid vehicle 20 may also perform inverter-less traveling when communication abnormality occurs between the HVECU 70 and the motor ECU 40 during traveling in the HV travel mode. In this case, the motor ECU 40 is unable to receive the target voltage VH* of the high voltage-side electric power line 54a or the shutdown command of the step up-down converter 55 from the HVECU 70. Therefore, the motor ECU 40 may compare the accelerator operation amount Acc from the accelerator pedal position sensor 84 with the threshold Aref. When the accelerator operation amount Acc is larger than the threshold Aref, the target voltage VH* of the high voltage-side electric power line 54a is set to control the step up-down converter 55, and on the other hand, when the accelerator operation amount Acc is equal to or below the threshold Aref, the step up-down converter 55 may shut down.

Although the hybrid vehicle 20 of the embodiment includes the step up-down converter 55, the hybrid vehicle 20 may not include the step up-down converter 55. In this case, when the accelerator operation amount Acc becomes equal to or below the threshold Aref, the system main relay 56 has only to be turned off.

Although the hybrid vehicle 20 of the embodiment includes the system main relay 56, the hybrid vehicle 20 may not include the system main relay 56. In this case, when the accelerator operation amount Acc becomes equal to or below the threshold Aref, the step up-down converter 55 has only to be shut down as in the embodiment.

Although the hybrid vehicle 20 of the embodiment uses the battery 50 as an electric storage device, any device, such as a capacitor, may be used as long as the device can store electricity.

Although the hybrid vehicle 20 of the embodiment includes the engine ECU 24, the motor ECU 40, the battery ECU 52, and the HVECU 70, at least two of the ECUs may be configured as a single electronic control unit.

A description is given of correspondence relation between main elements of the embodiments and main elements of the disclosure described in SUMMARY. In the embodiments, the engine 22 is one example of an "engine", the motor MG1 is one example of a "first motor", the planetary gear 30 is one example of a "planetary gear", the motor MG2 is one example of a "second motor", the inverter 41 is one example of a "first inverter", the inverter 42 is one example of a "second inverter", the battery 50 is one example of an "electric storage device", and the HVECU 70, the engine ECU 24, and the motor ECU 40 are examples of "electronic control units." The step up-down converter 55 is one example of a "step up-down converter", and the system main relay 56 is one example of a "relay."

Since the correspondence relation between the main elements of the embodiments and the main elements of the disclosure described in SUMMARY is one example to provide a specific description of the modes for carrying out the disclosure described in SUMMARY, the correspondence relation is not intended to limit the elements of the disclosure described in SUMMARY. More specifically, the disclosure disclosed in SUMMARY should be interpreted based on the description therein, and the embodiments are merely specific examples of the disclosure disclosed in SUMMARY.

Although the modes for carrying out the present disclosure have been described using the embodiments, the present disclosure is not limited in any manner to the embodiments disclosed. It should naturally be understood that the present disclosure can be carried out in various modes without departing from the scope of the present disclosure.

The present disclosure is applicable in the fields such as manufacturing of the hybrid vehicle.

What is claimed is:

1. A hybrid vehicle, comprising:
   an engine;
   a first motor generating a counter-electromotive voltage with rotation;
   a planetary gear including three rotation elements connected to three shafts, the shafts including a shaft of the first motor, a shaft of the engine, and a driving shaft coupled with driving wheels, the rotation elements being connected such that the first motor, the engine, and the driving shaft are arrayed in this order in an alignment chart;
   a second motor connected to the driving shaft;
   a first inverter driving the first motor;
   a second inverter driving the second motor;
   an electric storage device connected to the first inverter and the second inverter through electric power lines; and
   an electronic control unit being configured to control the engine such that, in specified traveling where the hybrid vehicle travels while operating the engine with the first inverter and the second inverter kept in a shutdown state, the first motor is rotated at a speed that causes the counter-electromotive voltage of the first motor to be higher than direct current-side voltages of the first inverter and the second inverter, and the first motor outputs torque to the driving shaft through the planetary gear,
   the electronic control unit being configured to interrupt electric power supply from a side of the first inverter and the second inverter to a side of the electric storage device when an accelerator operating amount becomes equal to or below a specified operating amount in the specified traveling.

2. The hybrid vehicle according to claim 1, further comprising
   a step up-down converter provided in the electric power lines, the step up-down converter being configured to transfer electric power between the side of the electric storage device and the side of the first inverter and the second inverter while changing voltage, wherein
   the electronic control unit is configured to control the engine and the step up-down converter such that the counter-electromotive voltage of the first motor becomes higher than the direct current-side voltages of the first inverter and the second inverter, when the accelerator operating amount is larger than the specified operating amount in the specified traveling, and
   the electronic control unit is configured to interrupt electric power supply from the side of the first inverter and the second inverter to the side of the electric storage device by shutting down the step up-down converter, when the accelerator operating amount becomes equal to or below the specified operating amount in the specified traveling.

3. The hybrid vehicle according to claim 1, further comprising a relay provided in the electric power lines, wherein
the electronic control unit is configured to interrupt electric power supply from the side of the first inverter and the second inverter to the side of the electric storage device by turning off the relay, when the accelerator operating amount becomes equal to or below the specified operating amount in the specified traveling.

4. The hybrid vehicle accordingly to claim 1, wherein
the electronic control unit is configured to control the engine such that, when the accelerator operating amount becomes equal to or below the specified operating amount in the specified traveling, the speed of the engine becomes smaller than the speed of the engine at a time when the accelerator operating amount is larger than the specified operating amount.

5. A control method for a hybrid vehicle, the hybrid vehicle including an engine; a first motor generating a counter-electromotive voltage with rotation; a planetary gear including three rotation elements connected to three shafts, the shafts including a shaft of the first motor, a shaft of the engine, and a driving shaft coupled with driving wheels, the rotation elements being connected such that the first motor, the engine, and the driving shaft are arrayed in this order in an alignment chart; a second motor connected to the driving shaft; a first inverter driving the first motor; a second inverter driving the second motor; an electric storage device connected to the first inverter and the second inverter through electric power lines, an electronic control unit being configured to control the engine such that, in specified traveling where the hybrid vehicle travels while operating the engine with the first inverter and the second inverter kept in a shutdown state, the first motor is rotated at a speed that causes the counter-electromotive voltage of the first motor to be higher than direct current-side voltages of the first inverter and the second inverter, and the first motor outputs torque to the driving shaft through the planetary gear (30), the control method comprising:
interrupting, by the electronic control unit, electric power supply from a side of the first inverter and the second inverter to a side of the electric storage device when an accelerator operating amount becomes equal to or below a specified operating amount in the specified traveling.

* * * * *